United States Patent
Qu et al.

(10) Patent No.: US 12,182,515 B2
(45) Date of Patent: Dec. 31, 2024

(54) UTTERANCE INTENT DETECTION

(71) Applicant: INTUIT INC., Mountain View, CA (US)

(72) Inventors: Yan Qu, Los Altos, CA (US); Lin Tao, Fremont, CA (US); Yingxin Wang, Newark, CA (US)

(73) Assignee: Intuit Inc., Mountain View, CA (US)

( * ) Notice: Subject to any disclaimer, the term of this patent is extended or adjusted under 35 U.S.C. 154(b) by 600 days.

(21) Appl. No.: 17/389,701

(22) Filed: Jul. 30, 2021

(65) Prior Publication Data
US 2023/0030870 A1    Feb. 2, 2023

(51) Int. Cl.
| | |
|---|---|
| G06F 40/30 | (2020.01) |
| G06F 16/33 | (2019.01) |
| G06F 16/338 | (2019.01) |
| G06F 40/44 | (2020.01) |
| G06N 3/045 | (2023.01) |
| G06N 3/0475 | (2023.01) |
| G06N 3/08 | (2023.01) |

(52) U.S. Cl.
CPC .......... G06F 40/30 (2020.01); G06F 16/3344 (2019.01); G06F 16/3347 (2019.01); G06F 16/338 (2019.01); G06F 40/44 (2020.01); G06N 3/045 (2023.01); G06N 3/0475 (2023.01); G06N 3/08 (2013.01)

(58) Field of Classification Search
CPC ................. G06F 40/30; G06F 16/3344; G06F 16/3347; G06F 16/338; G06F 40/44; G06N 3/045; G06N 3/0475; G06N 3/08

USPC .......................................................... 704/9
See application file for complete search history.

(56) References Cited

U.S. PATENT DOCUMENTS

| | | | | |
|---|---|---|---|---|
| 11,455,357 | B2* | 9/2022 | Tiwari | G06F 16/9535 |
| 11,468,238 | B2* | 10/2022 | Tiwari | G06F 40/289 |
| 11,481,417 | B2* | 10/2022 | Tiwari | G06F 16/3344 |
| 12,099,539 | B2* | 9/2024 | Dell | G06F 16/35 |
| 2020/0311204 | A1* | 10/2020 | Gupta | G06N 3/006 |
| 2020/0311738 | A1* | 10/2020 | Gupta | G06F 16/22 |
| 2020/0344194 | A1* | 10/2020 | Hosseinisianaki | G06N 3/084 |
| 2022/0414128 | A1* | 12/2022 | Raimondo | G06F 16/3344 |
| 2023/0030870 | A1* | 2/2023 | Qu | G06F 40/44 |

(Continued)

FOREIGN PATENT DOCUMENTS

| | | | |
|---|---|---|---|
| CN | 113468894 A | * | 10/2021 |
| CN | 115495636 A | * | 12/2022 |

(Continued)

*Primary Examiner* — Edwin S Leland, III
(74) *Attorney, Agent, or Firm* — Patterson + Sheridan, LLP (57) ABSTRACT

Certain aspects of the present disclosure provide techniques for detecting sentences that are utterances by an agent indicating an intent to poach a customer. According to certain embodiments, a language model is trained using query sentences that are confirmed to be sentences used in poaching a customer, to identify semantically similar sentences in a corpus. These semantically similar sentences are then used as base sentences for comparison to sentences in a transcript. Sentences of the transcript that are found to be semantically similar to one or more base sentences are provided to a user device for review and confirmation that the similar sentence was generated by an agent in an attempt to poach a customer.

20 Claims, 5 Drawing Sheets

(56) References Cited

U.S. PATENT DOCUMENTS

2023/0222149 A1* 7/2023 Dell ................... G06N 3/084
                                                   715/254
2023/0229957 A1* 7/2023 Li ..................... G06N 20/00
                                                   706/12

FOREIGN PATENT DOCUMENTS

CN     115544999 A  * 12/2022
WO   WO-2023040808 A1 *  3/2023

* cited by examiner

UTTERANCE INTENT DETECTION

INTRODUCTION

Aspects of the present disclosure relate to natural language processing, and in particular to identifying utterances that predict an intent of a speaker.

Service agents interacting with customers is well known by companies to enhance customer experience with products and services. When the expertise of the agent is a highlight of the offering of a company's product, there is a possibility that an agent may seek to supplant the offering outside the context of the product and poach the customer. However, finding examples of customer poaching by agents can be difficult when agents understand customer poaching is against company policy, and that transcripts of conversations may be reviewed by humans. Moreover, language is complex, and agents seeking to ask a customer to work with them outside of a product offering can be broken up and scattered across multiple sentences, in addition to using voice inflexion and other verbal ques to alter the meaning of language. Accordingly, discovery of an agent poaching a customer is relatively rare, and transcripts of these interactions are concomitantly rare.

This issue may become exasperated at scale, when seeking to train machine learning (ML) systems to identify particular agent interactions with customers, such as poaching attempts. Because positive examples of these interactions are rare, the training data set for such an ML system is challenging to obtain and therefore the ML system is difficult to train. As a possible result, many poaching-type interactions may be missed, and there may be many false-positives identified, adding further difficulty to developing a training corpus for such an ML system.

BRIEF SUMMARY

Certain embodiments provide a method that includes receiving a plurality of corpus sentences, receiving a plurality of query sentences, and determining a query sentence embedding for each query sentence of the plurality of query sentences. The method further includes determining a corpus sentence embedding for each corpus sentence of the plurality of corpus sentences, based on one or more query sentence embeddings of the plurality query sentences, determining a semantic similarity score for at least one corpus sentence embedding relative to at least one query sentence embedding of the plurality of query sentences, and identifying one corpus sentence as a base sentence, based on the semantic similarity score associated with the at corpus sentence embedding of the corpus sentence being at or above a threshold. The method further includes receiving a transcript sentence, determining a transcript similarity score for the transcript sentence, based on the base sentence, and providing an indicator of the transcript similarity score to a user device.

Further embodiments provide a method that includes receiving a base sentence embedding, receiving agent content, and generating an agent content embedding from the agent content. The method further includes generating a similarity score between the base sentence embedding and the agent content embedding, and identifying the agent content to a user based on the similarity score exceeding a first threshold.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure provide apparatuses, methods, processing systems, and computer-readable mediums for utterance intent detection. A number of companies incorporate agent interactions with customers of the company as part of product offerings. For example, in the tax preparation market, when a customer has a question or needs help with using a tax preparation product, she may need help beyond what is typical software-based help is able to provide. Having agents available to field customer questions can be a benefit to these product offerings, as customers do not feel like they are on their own to complete a complex process such as tax preparation.

However, many times the agents available for assisting customers may have a professional practice in the same area of endeavor that they are providing help in. The company providing the product, including hosting an application for interaction between agents and customers, may be concerned that agents may be poaching customers, in seeking to solicit customers to interact with the agent outside of the context of the host application. If an agent successfully solicits a customer, the agent may charge fees to the customers directly, without involvement from the company and outside of consumer protections provided by the company. Even though the company notifies the agents of an anti-poaching policy, and consequences of violation of this policy, agents may nevertheless be tempted to attempt to poach customers.

To discover poaching attempts by agents, according to certain embodiments, a machine learning (ML) model is trained to identify utterances by agents that may be related to an intent to poach customers. The ML model provides an indication to a user of an agent transcript sentence containing utterances that are similar to utterances identified to be related to an intent to poach a customer.

Figure 1:
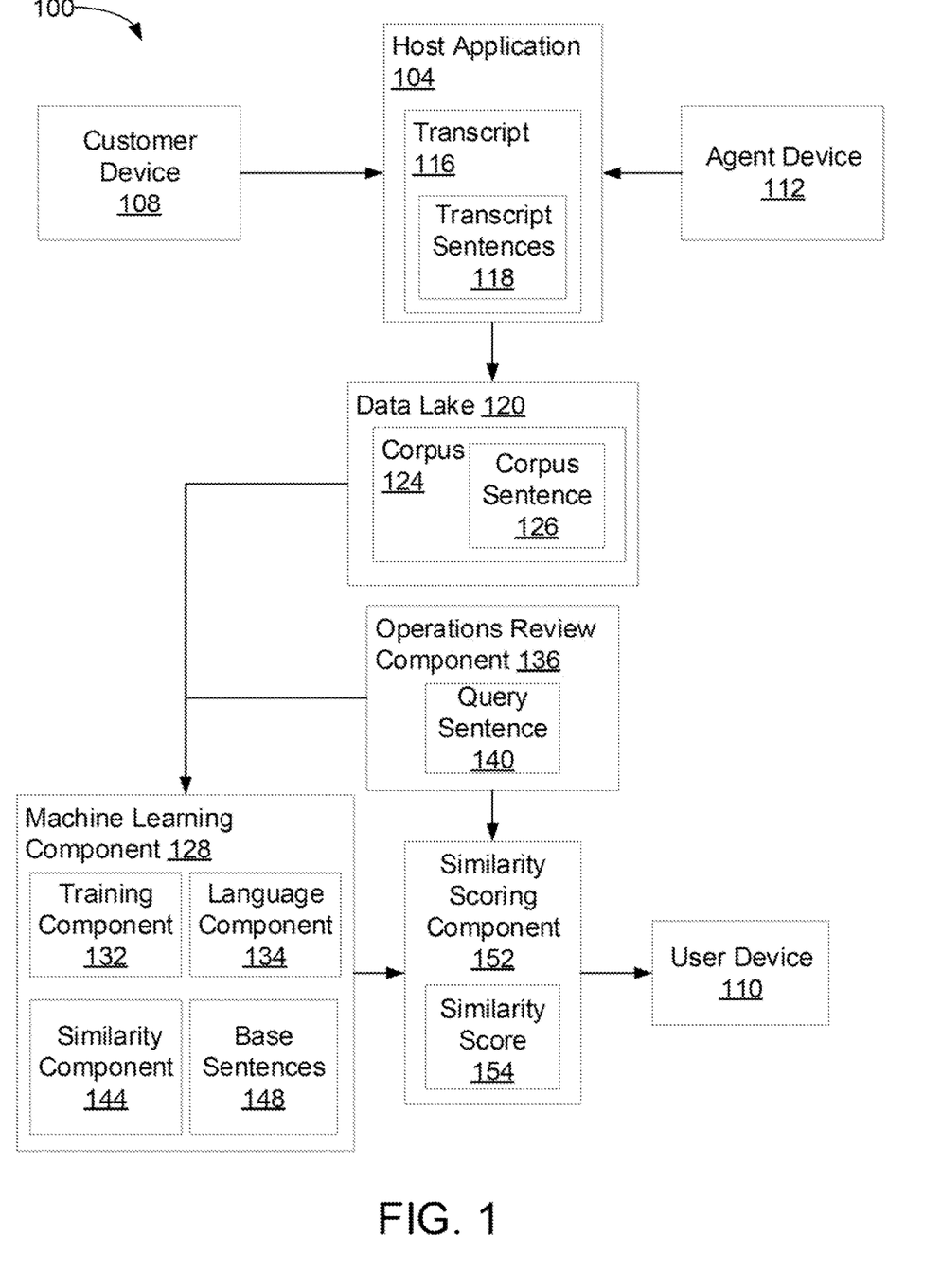
FIG. 1 depicts a system for utterance intent detection, according to certain embodiments.

FIG. 1 depicts a system 100 for utterance intent detection, according to certain embodiments. A host application 104 provides a communication platform between a customer device 108 and an agent device 112. According to certain embodiments, host application 104 may be part of a larger application that provides functionality related to communication between a customer and an agent, such as for tax preparation, accounting, ERP, database operations, gaming, business management, or other application that may benefit from interactions between a customer and an agent supporting the customer. Customer device 108 and agent device 112 may be any device capable of verbal, visual, and/or text based communications, such as a smart phone, tablet, computer (laptop, desktop, or otherwise), dedicated telephone, or the like.

Host application 104 is capable of recording communications between the customer device 108 and the agent device 112, in a transcript 116. Utterances in the form of voice, text, and other data may be captured by transcript 116, and according to certain embodiments, voice data is translated to text, which includes one or more utterances in the form of transcript sentences 118. According to certain embodiments, one or more transcript sentences 118 are attributable to the customer device 108 (and the customer), and one or more transcript sentences are attributable to the agent device 112 (and the agent). In some embodiments, a transcript sentence may be parsed into one or more smaller sentences, for example, by separating portions of the transcript sentence based on a split( ) function (e.g., in examples using PYTHON™ as a development language), splitting a transcript sentence by replacing punctuation such as commas, semicolons, and the like, with a period. As host application 104 may additionally provide functionality beyond facilitating communications, data related to the additional functionality may be stored as well.

System 100 further includes a data lake 120 coupled to the host application 104, to where one or more transcripts generated by a host application, such as transcript 116 may be stored in corpus 124, that includes one or more corpus sentences 126. In this context corpus 124 includes a plurality of sentences (e.g., utterances) from previously stored plurality of transcripts, each of which may be like transcript 116. According to certain embodiments, sentences from the plurality of transcripts are from previous customer-agent interactions on host application 104, and may come from similar interactions on different applications.

Data lake 120 is coupled to machine learning (ML) component 128, which includes a training component 132. According to certain embodiments, training component 132 includes one or more language pre-training algorithms configured to train the ML component 128. Using elements of the corpus 124 in conjunction with one or more query sentences, such as query sentence 140 (discussed below) from an operations review component 136, ML component 128 is trained to develop a language model 134 for evaluating utterances in the transcript 116. A query sentence in this context may be a sentence (e.g., an utterance) made by an agent that has been confirmed to indicated an intent to poach a customer. Training component 132 generates sentence embeddings from the query sentences 140 and the sentences of the corpus 124. In this context, sentences embedding is a collective name for natural language processing (NLP) techniques by which sentences are mapped to vectors of real numbers. In certain embodiments, training component 132 clusters sentence embeddings from the corpus 124 based on the query sentence 140 embeddings to generate language model 134. In some embodiments, sentence embedding clustering is carries out by the training component 132 using Sentence Bidirectional Encoder Representation from Transformers (SBERT), that according to certain embodiments maps each sentence embedding to a vector space such that semantically similar sentences are close in the vector space than semantically dissimilar.

According to certain embodiments, a Siamese neural network architecture is employed by SBERT to enable fixed-size sentence embeddings, derived from provided text (e.g., query sentence 140, sentences from corpus 124, and the like). In this context, a Siamese neural network is an artificial neural network that uses the same weights while working in tandem on two different input vectors to compute comparable output vectors. One of the output vectors is precomputed, forming a baseline against which the other output vector is compared. According to certain embodiments, algorithms other than SBERT may be employed, such as Bidirectional Encoder Representation from Transformers (BERT), Embeddings from Language Models (ELMo), and Generative Pre-Trained Transformer (OpenAI GPT).

Once the training component 132 places the query sentence 140 and sentences from the corpus 124 in vector space, one or more sentences from the corpus 124 is measured against query sentence 140 for similarity. If the A corpus sentence 126 is sufficiently similar (discussed below) to a query sentence 140, this would be an indicator that the corpus sentence 126 is an utterance by an agent that indicates an intent to poach a customer. According to certain embodiments, cosine similarity may be used to determine sentence semantic similarity between one or more query sentence 140 and sentences of the corpus 124, and may be implemented in similarity component 144. Although cosine similarity is discussed, according to certain embodiments other techniques to determined semantic similarity between sentences may be employed such as Sorensen-Dice coefficient, Hamming distance, Jaccard index, and the like. In this context, cosine similarity may be a measure of similarity between two sentence embeddings (e.g., vectors) as defined by the cosine of the angle between the vectors, which may also be the same as the inner product of the same sentence embeddings normalized to a length of 1. Accordingly, the measure of cosine similarity may be based solely on orientation of the sentence embeddings and not magnitude: two vectors with the same orientation have a cosine similarity of 1, two vectors oriented at 90° relative to each other have a similarity of 0, and two vectors diametrically opposed have a similarity of −1, independent of their magnitude.

Once cosine similarity is determined between each sentence of the corpus 124 and at least one query sentence 140, one or more base sentences 148 is determined that are indicators of agent utterances made with an intent to poach a customer. The base sentences 148 are provided to a similarity scoring component 152 that scores similarity of a transcript to base sentences and query sentences. According to certain embodiments, one or more query sentences 140 are also provided to similarity scoring component 152 as base sentences 148. A threshold for similarity component 144 may be set by a user, and according to some embodiments is set to 0.75, but any value may be chosen. A base sentence 148 according to certain embodiments is a corpus sentence 126 found to be sufficiently similar (e.g., per the threshold) to a query sentence 140 so as to indicate an utterance indicating a poaching attempt by an agent. The threshold may be set so that a sufficiently broad representation of corpus sentences 126 may be identified as poaching attempts.

Operations review component 136 is coupled to ML component 128. Operations review component 136 according to certain embodiments is a repository for one or more query sentences 140 that are sentences confirmed to be part of a conversation in which an agent has sought to poach a customer.

Similarity scoring component 152 receives one or more base sentences 148 from the ML component 128, and the transcript 116 from either the data lake 120 or from the host application 104. One or more transcript sentences 118 are compared to one or more base sentences 148 to find transcript sentences that are similar to base sentences 148. In some embodiments, this comparison is carried out within the similarity scoring component 152 to generate a similarity score 154 by generating sentence embeddings for each of the transcript sentences 118 and base sentences 148, and computing the cosine similarity to determine similarity, and other techniques for determining semantic similarity between sentences may be used. A similarity threshold for cosine similarity in this context may be set by a user of the system 100, and in some embodiments is set to 0.99 to limit the number of false positives, and any value may be chosen.

According to certain embodiments, the similarity score 154 may be generated by adjusting the cosine similarity as described above with an Inverse Document Frequency (IDF) to further tune the similarity score 154 to avoid false positives. By way of example, IDF is:

$$1/(1+\text{Document Frequency}) \quad (1)$$

where Document Frequency is the number of transcripts that have the same matching sentence to the base sentence 148 determined as described above, that is to be removed from consideration (e.g., as a false positive). In these embodiments, the similarity score 154 is determined by:

$$\text{similarity score}=\text{threshold}-\text{theta}+(\text{score}-\text{threshold}+\text{theta})*\text{IDF}, 0<\text{theta}<\text{threshold} \quad (2)$$

where threshold is the threshold utilized for determining the cosine similarity described above (e.g., 0.99 in the above example), and theta is a parameter that controls how much of the original score (e.g., as determined by cosine similarity) will be adjusted. According to certain embodiments, theta may be calculated by:

$$\text{theta}=(\text{max\_score}-\text{threshold})/((1/\text{IDF})-1)-1) \quad (3)$$

where max score=1 (e.g., the maximum score available using cosine similarity, according to certain embodiments.

By way of example if a particular transcript sentence from transcript 116 is desired to be removed (e.g., considered to be a false positive), and that particular transcript sentence has appeared in at least 4 other transcripts previously:

$$\text{Document Frequency}=4 \quad (4)$$

$$\text{IDF}=1/(1+4)=0.2 \quad (5)$$

$$\text{threshold}=0.99 \quad (6)$$

$$\text{theta}=(1.0-0.99)/((1/0.2)-1)=0.0025 \quad (7)$$

In the example of a case in which a particular sentence has appeared greater than or equal to 4 times before, in which the original similarity score 154 is 0.998 (e.g., using cosine similarity alone), the final similarity score as adjusted by IDF will be:

$$\text{threshold}-\text{theta}+(\text{score}-\text{threshold}+\text{theta})*\text{ID}; \quad (8)$$

$$\text{using the example values above: } 0.99-0.0025+ (0.998-0.99+0.0025)*0.2=0.9896 \quad (9)$$

The resulting similarity score in this example embodiment, 0.9896, is less than the example threshold for similarity, and thus a positive result would not be generated in this example.

When one or more transcript sentences 118 meet the similarity threshold of similarity scoring component 152, this indicates that an utterance (e.g., sentence) of an agent may indicate an intent to poach a customer. An indicator may be provided to a user device such as user device 110 to further process the transcript sentence 118. The indicator may be an email, a message (e.g., via SMS, SLACK™, or other platform), audible indicator, or a visual indicator (e.g., a portion of a user interface flashing, changing color, etc.). In this context, the indicator presents a notification on the user device 110 that a sentence from a transcript 116 from communications received from an agent device 112 may be related to customer poaching.

Figure 2:
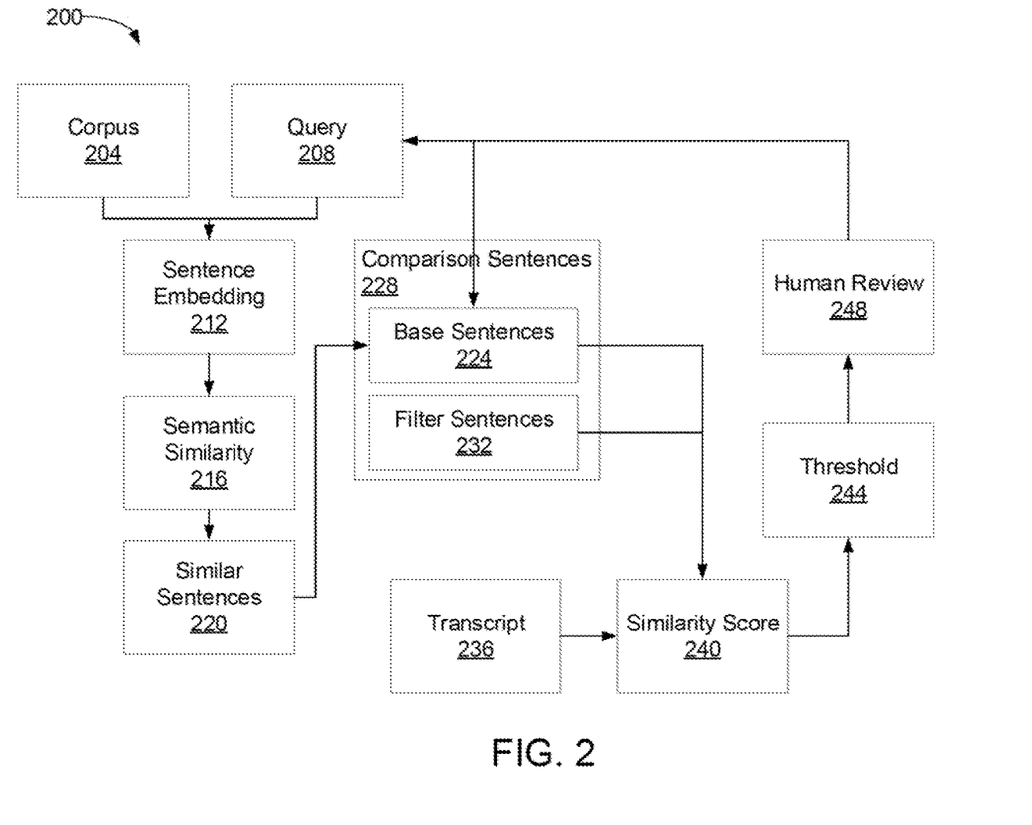
FIG. 2 depicts a process diagram for utterance intent detection, according to certain embodiments.

FIG. 2 depicts a process diagram 200 for utterance intent detection, according to certain embodiments. At 204 a corpus that includes one or more corpus sentences is received from a data source such as data lake 120 of FIG. 1, that may be the same as corpus 124, and one or more queries at query 208 is received from operations review component 136, that each may be the same as query sentence 140. Sentence embeddings are generated by a machine learning component such as machine learning component 128 of FIG. 1, for each corpus sentence and each of the queries at sentence embedding 212. This may be similar to sentence embedding that takes place in training component 132 of FIG. 1. At similar sentences 220, the sentence embeddings are compared for semantic similarity, according to certain embodiments via cosine similarity, that may be carried out by similarity component 144. At similar sentences 220, corpus sentences that are found to meet a threshold for cosine similarity when compared to query sentences are designated as base sentences 224 that may be the same as base sentences 148 of FIG. 1 and provided to comparison sentences 228. According to certain embodiments, one or more filter sentences 232 may be additionally provided to comparison sentences 228, and compared to one or more client sentences present in a transcript.

A similarity score is generated at 236 by similarity scoring component 152 based on transcript sentences a transcript 240, that may be the same as transcript sentences 118 of transcript 116, of FIG. 1, and the base sentences 224, generating a threshold at 244, that may be the same as the threshold generated at similarity scoring component 152 of FIG. 1. If the threshold is met, the transcript sentences may be flagged for human review at 248 by providing an indicator to a user device, as discussed above. If human review confirms that a transcript sentence is a poaching attempt, the confirmed sentence is provide as query sentence such as query sentence 140 of FIG. 1 to query 208.

Figure 3:
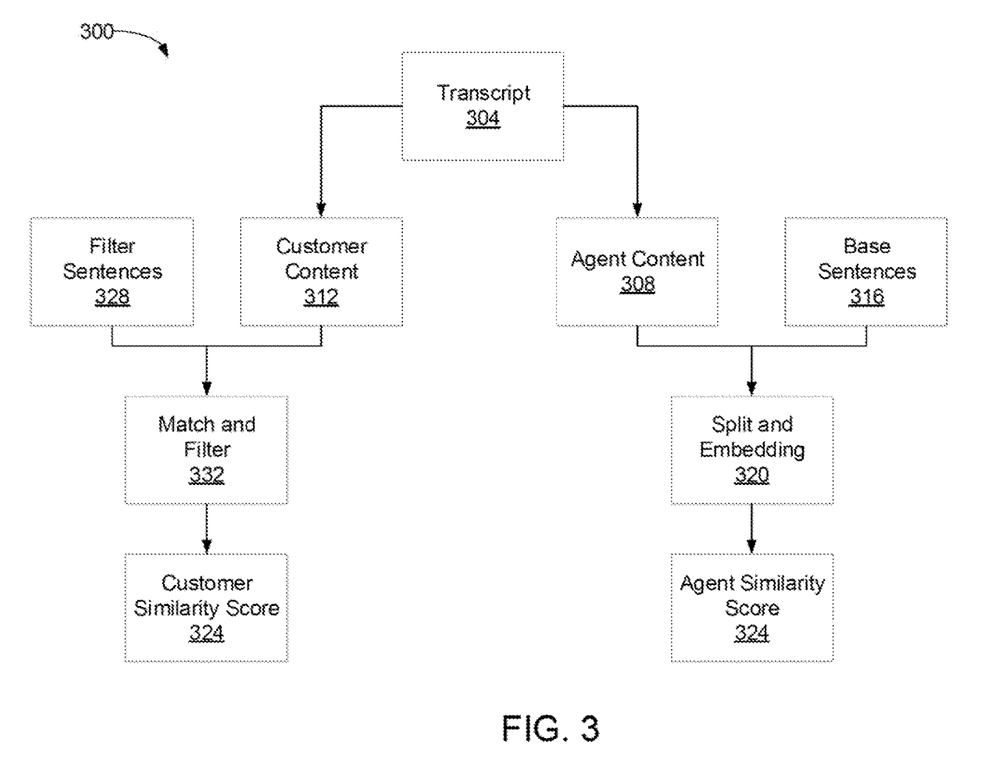
FIG. 3 depicts a process diagram for utterance intent detection, according to certain embodiments.

FIG. 3 depicts a process diagram 300 for utterance intent detection, according to certain embodiments. A transcript 304 of a customer-agent interaction, such as transcript 116 of FIG. 1 and parsed into agent content 308 and customer content 312 that includes one or more customer sentences using NLP techniques for differentiating between two speakers in a conversation. In this context, agent content 308 are sentences of the transcript 304 that are attributable to an agent, while customer content 312 are sentences of the transcript 304 that are attributable to the customer.

In a similarity scoring component at 320, such as similarity scoring component 152, agent content 308 and base sentences 316 may be split (as described above) according to certain embodiments, and embedded to sentence embeddings. The sentence embedding of the agent content 308 and base sentences 316 receive an agent similarity score at 324, for example, from similarity scoring component 152 of FIG. 1.

Similarly, at 332 customer content 312 and filter sentences 328 are matched and filtered. Filter sentences 328 in this context are sentences from a customer that are confirmed to have been part of an agent poaching attempt. The customer content is matched and filtered against the filter sentences, generating a customer similarity score at 328.

Figure 4:
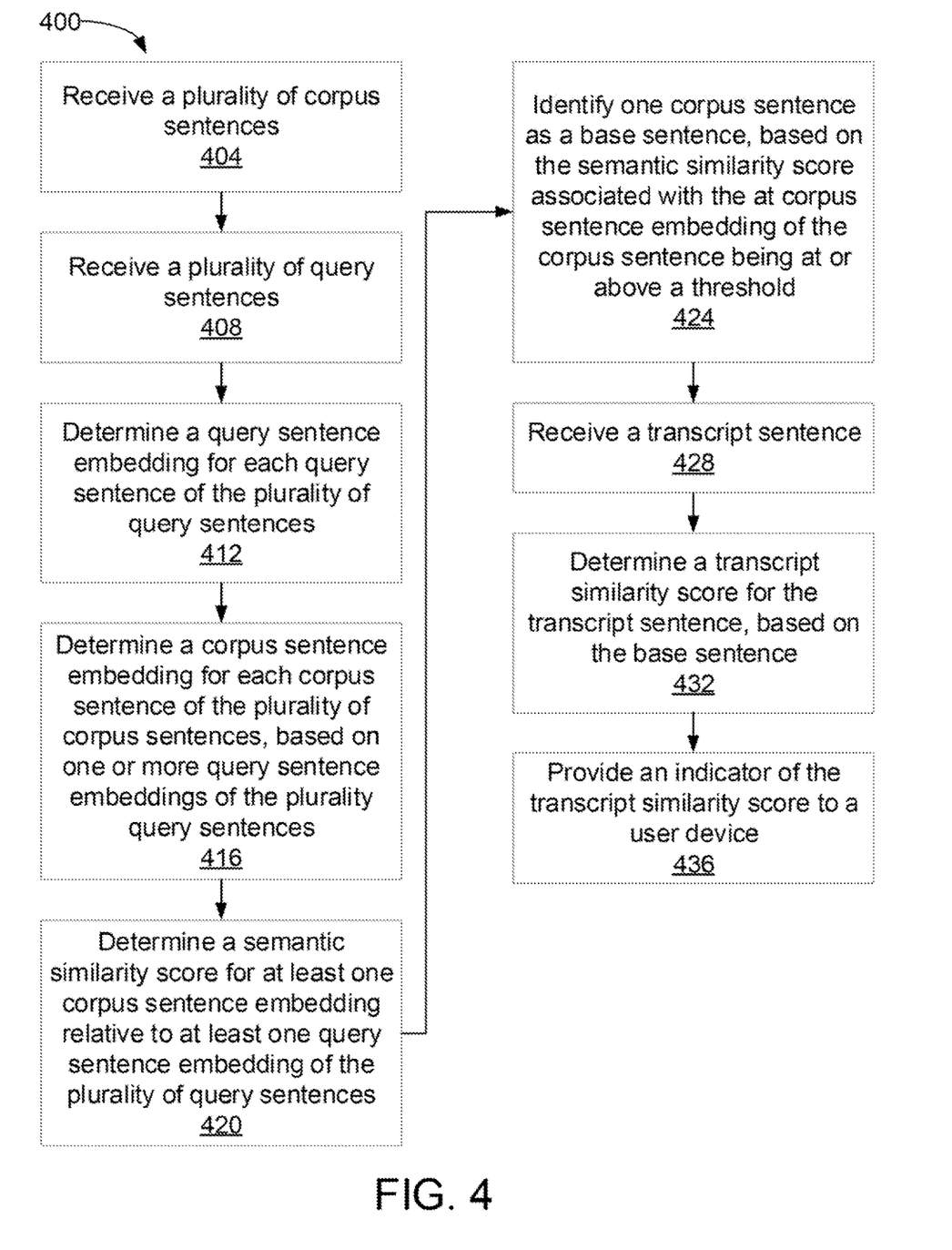
FIG. 4 depicts a method for utterance intent detection, according to certain embodiments.

FIG. 4 depicts a method 400 for utterance intent detection, according to certain embodiments. At 404, machine learning component 128 receives a corpus 124 of sentences. According to certain embodiments the corpus may be a collection of transcripts from previous transactions between agents and users.

At 408 the machine learning component 128 receives a plurality of query sentences 140. According to certain embodiments, query sentences may be confirmed sentences containing utterances of a transaction in which an agent sought to poach a user of a host application.

At 412 the machine learning component 128 determines a query sentence embedding for each query sentence of the plurality of query sentences.

At 416 the machine learning component 128 determines a corpus sentence embedding for each corpus sentence of the plurality of corpus sentences, based on one or more query sentence embeddings of the plurality query sentences. According to certain embodiments, determining the corpus sentence embedding comprises clustering each corpus sentence embedding based on one or more of the query sentence embeddings. According to certain embodiments, the clustering is carried out by one of a bidirectional encoder representations from transformers (BERT) or a sentence BERT (SBERT). According to certain embodiments, one of the plurality of corpus sentences is split into two or more corpus sentences.

At 420 the machine learning component 128 determines a semantic similarity score for at least one corpus sentence embedding relative to at least one query sentence embedding of the plurality of query sentences. According to certain embodiments, determining the semantic similarity score comprises determining a cosine similarity between the at least one corpus sentence embedding and the at least one query sentence embedding.

At 424 the machine learning component 128 identifies one corpus sentence as a base sentence, based on the semantic similarity score associated with the at corpus sentence embedding of the corpus sentence being at or above a threshold.

At 428 the similarity scoring component 152 receives a transcript sentence. According to certain embodiments, the transcript is generated from one of a voice or text interaction between an agent and a customer.

At 432 the similarity scoring component 152 determines a transcript similarity score for the transcript sentence, based on the base sentence.

At 436 the similarity scoring component 152 provides an indicator of the transcript similarity score to a user device. According to certain embodiments, the indicator identifies the transcript similarity score and the transcript for human review.

Figure 5:
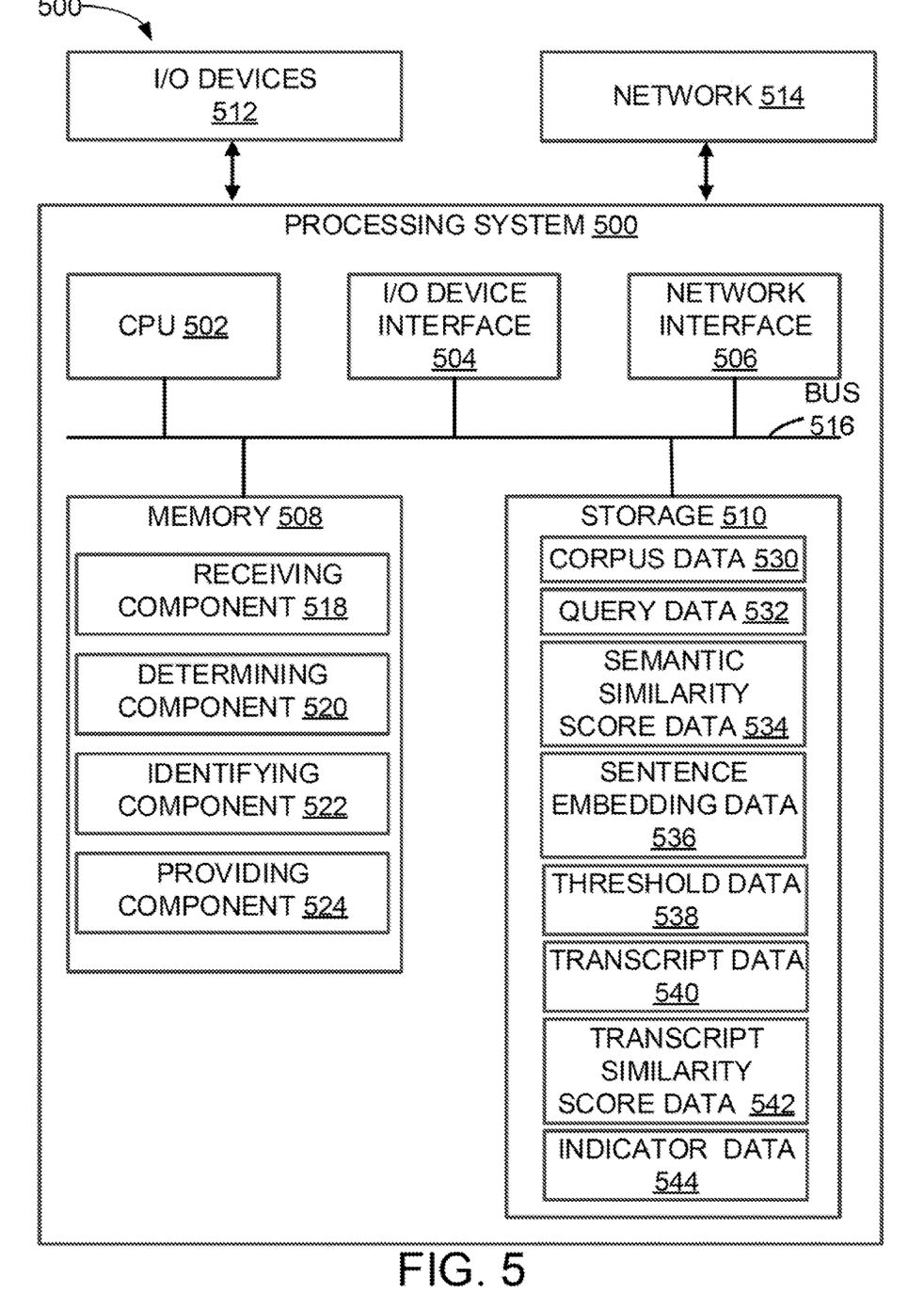
FIG. 5 depicts an example processing system that may perform the methods described herein, such as a system and method for utterance intent detection as described with respect to FIGS. 1-4.

FIG. 5 depicts an example processing system 500 that may perform the methods described herein, such as a system and method for utterance intent detection described with respect to FIGS. 1-4.

Server 500 includes a central processing unit (CPU) 502 connected to a data bus 516. CPU 502 is configured to process computer-executable instructions, e.g., stored in memory 508 or storage 510, and to cause the processing system 500 to perform methods described herein, for example with respect to FIGS. 1-4. CPU 502 is included to be representative of a single CPU, multiple CPUs, a single CPU having multiple processing cores, and other forms of processing architecture capable of executing computer-executable instructions, including distributed architectures such as in a cloud, or virtualized, platform.

Server 500 further includes input/output (I/O) device(s) 512 and interfaces 504, which allows processing system 500 to interface with input/output devices 512, such as, for example, keyboards, displays, mouse devices, pen input, and other devices that allow for interaction with processing system 500. Note that processing system 500 may connect with external I/O devices through physical and wireless connections (e.g., an external display device).

Server 500 further includes a network interface 506, which provides processing system 500 with access to external network 514 and thereby external computing devices.

Server 500 further includes memory 508, which in this example includes a receiving component 518, a determining component 520, an identifying component 522, and a providing component 524, for performing operations described in FIGS. 1-4.

Note that while shown as a single memory 508 in FIG. 5 for simplicity, the various aspects stored in memory 508 may be stored in different physical memories, including memories remote from processing system 500, but all accessible by CPU 502 via internal data connections such as bus 516.

Storage 510 further includes corpus data 530, query data 532, semantic similarity score data 534, sentence embedding data 536, threshold data 538, transcript data 540, transcript similarity score data 542, and indicator data 544, for performing operations as described in FIGS. 1-4.

As with memory 508, a single storage 510 is depicted in FIG. 5 for simplicity, but various aspects stored in storage 510 may be stored in different physical storages, including remote from processing system 500, and all accessible to CPU 502 via internal data connections, such as bus 516, or external connection, such as network interfaces 506. One of skill in the art will appreciate that one or more elements of processing system 500 may be located remotely and accessed via a network 514.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or component(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   receiving a plurality of corpus sentences, wherein each corpus sentence of the plurality of corpus sentences comprises a sentence from a respective transcript of previous interactions involving a respective agent;
   receiving a plurality of query sentences, wherein each query sentence of the plurality of query sentences is associated with an intent to poach a customer;
   determining a query sentence embedding for each query sentence of the plurality of query sentences;
   determining a corpus sentence embedding for each corpus sentence of the plurality of corpus sentences, based on one or more query sentence embeddings of the plurality of query sentences;
   determining a semantic similarity score for at least one corpus sentence embedding relative to at least one query sentence embedding of the plurality of query sentences;
   identifying one corpus sentence as a base sentence, based on the semantic similarity score associated with the corpus sentence embedding of the corpus sentence being at or above a threshold;
   receiving a transcript sentence;
   providing the transcript sentence to a machine learning model, wherein the machine learning model has been trained through a supervised learning process using training data that includes the base sentence to determine a transcript similarity score for the transcript sentence based on the base sentence;
   receiving a transcript similarity score for the transcript sentence from the machine learning model;
   detecting the intent in the transcript sentence based on the transcript similarity score exceeding a threshold; and
   providing an output to a user device based on the detected intent.

2. The method of claim 1, wherein determining the corpus sentence embedding for each corpus sentence of the plurality of corpus sentences comprises clustering each corpus sentence embedding based on one or more of the query sentence embeddings.

3. The method of claim 2, wherein the clustering is carried out by one of a bidirectional encoder representations from transformers (BERT) or a sentence BERT (SBERT).

4. The method of claim 3, wherein determining the semantic similarity score comprises determining a cosine similarity between the at least one corpus sentence embedding and the at least one query sentence embedding.

5. The method of claim 3, wherein one of the plurality of corpus sentences is split into two or more corpus sentences.

6. The method of claim 5, wherein the output provided to the user device identifies the transcript similarity score and the transcript sentence for human review.

7. The method of claim 6, wherein the transcript is generated from one of a voice or text interaction between an agent and a customer.

8. A system comprising:
a memory comprising computer-readable instructions;
a processor configured to read the computer-readable instructions, that cause the system to:
receive a plurality of corpus sentences, wherein each corpus sentence of the plurality of corpus sentences comprises a sentence from a respective transcript of previous interactions involving a respective agent;
receive a plurality of query sentences, wherein each query sentence of the plurality of query sentences is associated with an intent to poach a customer;
determine a query sentence embedding for each query sentence of the plurality of query sentences;
determine a corpus sentence embedding for each corpus sentence of the plurality of corpus sentences, based on one or more query sentence embeddings of the plurality of query sentences;
determine a semantic similarity score for at least one corpus sentence embedding relative to at least one query sentence embedding of the plurality of query sentences;
identify one corpus sentence as a base sentence, based on the semantic similarity score associated with the corpus sentence embedding of the corpus sentence being at or above a threshold;
receive a transcript sentence;
provide the transcript sentence to a machine learning model, wherein the machine learning model has been trained through a supervised learning process using training data that includes the base sentence to determine a transcript similarity score for the transcript sentence, based on the base sentence;
receive a transcript similarity score for the transcript sentence from the machine learning model;
detect the intent in the transcript sentence based on the transcript similarity score exceeding a threshold; and
provide an indicator of the transcript similarity score to a user device.

9. The system of claim 8, wherein determining the corpus sentence embedding for each corpus sentence of the plurality of corpus sentences comprises clustering each corpus sentence embedding based on one or more of the query sentence embeddings.

10. The system of claim 9, wherein the clustering is carried out by one of a bidirectional encoder representations from transformers (BERT) or a sentence BERT (SBERT).

11. The system of claim 10, wherein determining the semantic similarity score comprises determining a cosine similarity between the at least one corpus sentence embedding and the at least one query sentence embedding.

12. The system of claim 10, wherein one of the plurality of corpus sentences is split into two or more corpus sentences.

13. The system of claim 12, wherein the indicator identifies the transcript similarity score and the transcript sentence for human review.

14. The system of claim 13, wherein the transcript is generated from one of a voice or text interaction between an agent and a customer.

15. A method comprising:
receiving a base sentence embedding, wherein the base sentence embedding is generated for a base sentence, wherein the base sentence embedding is used to identify the base sentence as semantically similar to a sentence that is associated with an intent to poach a customer;
receiving agent content;
generating an agent content embedding from the agent content;
generating a similarity score between the base sentence embedding and the agent content embedding using a machine learning model that has been trained through a supervised learning process using training data that includes the base sentence; and
identifying the intent and providing an output to a user based on the similarity score exceeding a given threshold.

16. The method of claim 15, further comprising:
receiving a plurality of corpus sentences, wherein each corpus sentence of the plurality of corpus sentences comprises a sentence from a respective transcript of previous interactions involving a respective agent;
receiving a plurality of query sentences, wherein each query sentence of the plurality of query sentences is associated with an intent to poach a customer;
determining a corpus sentence embedding for each corpus sentence of the plurality of corpus sentences, based on one or more query sentence embeddings of the plurality of query sentences;
detecting the intent in at least one corpus sentence of the plurality of corpus sentences based on providing the at least one corpus sentence to a machine learning model, wherein the machine learning model has been trained through a supervised learning process using training data that includes the base sentence to determine a semantic similarity score for the corpus sentence embedding of the at least one corpus sentence relative to at least one query sentence embedding of the plurality of query sentences; and
identifying the at least one corpus sentence as an additional base sentence, based on the semantic similarity score associated with the corpus sentence embedding of the at least one corpus sentence being at or above a threshold.

17. The method of claim 16, wherein determining the corpus sentence embedding for each corpus sentence of the plurality of corpus sentences comprises clustering each corpus sentence embedding based on one or more of the query sentence embeddings.

18. The method of claim 17, wherein the clustering is carried out by one of a bidirectional encoder representations from transformers (BERT) or a sentence BERT (SBERT).

19. The method of claim 15 further comprising:
receiving a filter sentence;
receiving customer content comprising a customer sentence; and
matching the filter sentence to the customer sentence.

20. The method of claim 19, wherein generating the similarity score further comprises generating the similarity score based on the matching of the filter sentence to the customer sentence.

\* \* \* \* \*